(No Model.)

W. H. TRAMMEL.
NUT LOCK.

No. 415,589. Patented Nov. 19, 1889.

Witnesses:

Inventor:
William H. Trammel
By, Smith & Sheehy
Attorneys

UNITED STATES PATENT OFFICE.

WILLIAM H. TRAMMEL, OF HUNTINGTON, INDIANA.

NUT-LOCK.

SPECIFICATION forming part of Letters Patent No. 415,589, dated November 19, 1889.

Application filed July 26, 1889. Serial No. 318,786. (No model.)

*To all whom it may concern:*

Be it known that I, WILLIAM H. TRAMMEL, a citizen of the United States, residing at Huntington, in the county of Huntington and State of Indiana, have invented certain new and useful Improvements in Nut-Locks; and I do declare the following to be a full, clear, and exact description of the invention, such as will enable others skilled in the art to which it appertains to make and use the same.

This invention relates to improvements in devices for locking nuts on bolts, and the novelty will be fully understood from the following description and claims, when taken in connection with the accompanying drawings, in which—

Figure 1:
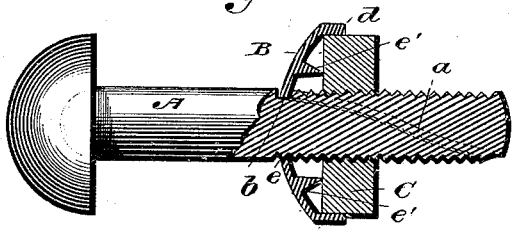
Figure 2:
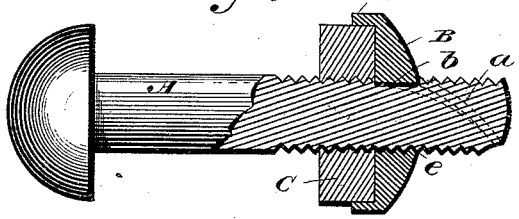
Figure 3:
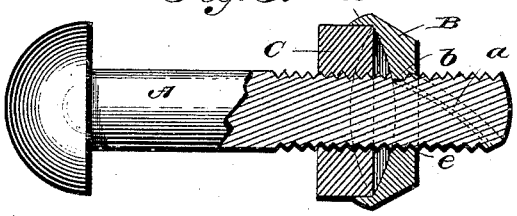
Figure 4:
Figure 5:
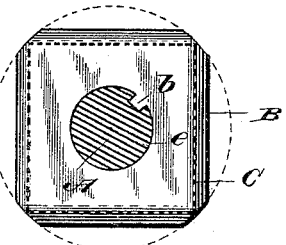

Figure 1 is a side elevation of a bolt, showing the threaded portion in longitudinal section with my improvements applied. Fig. 2 is a similar view showing a solid lock nut or plate applied on the outer side of the securing-nut. Fig. 3 is also a similar view of a modification of the lock. Fig. 4 is a side elevation of a portion of the bolt, showing the groove; and Fig. 5 is a cross-sectional view of the bolt with my improvements in position.

Referring by letter to the said drawings, A indicates a bolt, which is threaded for a sufficient distance of its length, as shown, and this threaded portion is provided with a worm or differential groove $a$, which is designed to receive a lug or tooth $b$, formed in the bore $e$ of the lock plate or nut B.

C indicates a nut, which may be of any ordinary construction to be turned on the bolt.

The lock nut or plate B is preferably of a plano-convex form, and has a reduced margin $d$, which is adapted to be turned over or beat down upon the side of the nut C when in position upon the bolt.

By reference to the construction shown in Fig. 1 of the drawings it will be seen that the plate B is concavo-convex in cross-section and is of a greater diameter than the nut C, so that its overlying edges may be turned against the side walls of the nut to lock the same. This plate is also provided on its inner or concave side with studs $e'$, which may be pointed somewhat at their ends, and are designed to engage the inner side of a nut when the parts are in position.

I prefer for heavy work to have the locking nut or plate of the form shown in Figs. 2 and 3, and in such cases the lug or tooth B is increased according to the increased thickness of the nut or plate B, thereby rendering the locking-nut much stronger and durable.

It will be observed that the aperture in the plate or nut B is free from teeth or threads, and that the groove in the bolt is oblique or serpentine with respect to the longitudinal plane thereof, so that when the nut C has been turned upon the bolt to the desired point the nut B, with its tooth or lug placed in the groove of the bolt, is moved up against the nut C. Then by simply driving by a hammer or other suitable implement the reduced marginal edges of the nut B down upon the flat sides of the nut C the latter will be prevented from turning upon the bolt, as any tendency to move the nut C would cause the tooth or lug of the nut B to crowd against the side walls of the groove and thereby prevent either from turning.

The form shown in Fig. 1 may be used upon light work and placed upon the inner side of the nut, while for heavy work I prefer to employ the convex nut of a solid form.

Having described my invention, what I claim is—

1. The combination, with a threaded bolt having a longitudinal serpentine or oblique groove, of a threaded nut and a convex nut having a tooth or lug in its bore adapted to enter the groove of the bolt, and having its marginal edges reduced in thickness, so that they may be turned over the side walls of the nut, substantially as specified.

2. The combination, with a threaded bolt having an oblique or serpentine groove in its threaded portion, of a threaded nut and a locking plate or nut of concavo-convex form having a tongue or lug in its bore adapted to engage the groove in the bolt, and its marginal edge adapted to be turned over the flat sides of a nut, substantially as specified.

In testimony whereof I affix my signature in presence of two witnesses.

WILLIAM H. TRAMMEL.

Witnesses:
F. W. DASHIELL,
F. E. TURPIN.